(12) United States Patent
Chan

(10) Patent No.: US 12,285,675 B2
(45) Date of Patent: Apr. 29, 2025

(54) SLIDE BUTTON ACTUATORS

(71) Applicant: RAZER (ASIA-PACIFIC) PTE. LTD., Singapore (SG)

(72) Inventor: Chun Chiang Chan, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 248 days.

(21) Appl. No.: 16/633,568

(22) PCT Filed: Jul. 27, 2017

(86) PCT No.: PCT/SG2017/050383
§ 371 (c)(1),
(2) Date: Jan. 23, 2020

(87) PCT Pub. No.: WO2019/022661
PCT Pub. Date: Jan. 31, 2019

(65) Prior Publication Data
US 2020/0155929 A1    May 21, 2020

(51) Int. Cl.
*A63F 13/24* (2014.01)
*H01H 15/24* (2006.01)

(52) U.S. Cl.
CPC ............. *A63F 13/24* (2014.09); *H01H 15/24* (2013.01); *H01H 2221/014* (2013.01); *H01H 2221/044* (2013.01)

(58) Field of Classification Search
None
See application file for complete search history.

(56) References Cited

U.S. PATENT DOCUMENTS

| | | |
|---|---|---|
| 5,012,230 A | 4/1991 | Yasuda |
| 6,234,479 B1 * | 5/2001 | Watanabe ............... A63F 13/24 |
| | | 463/37 |
| 6,288,709 B1 | 9/2001 | Willner et al. |

(Continued)

FOREIGN PATENT DOCUMENTS

| | | |
|---|---|---|
| CN | 1910542 A | 2/2007 |
| CN | 102090048 A | 6/2011 |

(Continued)

OTHER PUBLICATIONS

International Search Report and Written Opinion, dated Apr. 26, 2018, for the corresponding International Application No. PCT/SG2017/050383 in 8 pages.

(Continued)

*Primary Examiner* — Peter J Iannuzzi
(74) *Attorney, Agent, or Firm* — Polsinelli PC (57) ABSTRACT

An input device is provided to supply multiple input from a button. The input device may include a first switch and a second switch. The input device may further include a slide button on a surface of the input device. The slide button may actuate the first switch when the slide button slides along a first direction substantially parallel to the surface of the input device. The slide button may actuate the second switch when the slide button slides along a second direction substantially parallel to the surface of the input device. The input device may further include a third switch. The slide button may actuate the third switch of the input device when the slide button is pressed towards the surface of the input device.

19 Claims, 5 Drawing Sheets

(56) References Cited

U.S. PATENT DOCUMENTS

| | | | |
|---|---|---|---|
| 6,512,511 B2 | 1/2003 | Willner et al. | |
| 6,659,870 B2 | 12/2003 | Sobota | |
| 6,760,013 B2 | 7/2004 | Willner et al. | |
| 6,831,238 B1* | 12/2004 | Lau | H01H 25/002 |
| | | | 200/6 A |
| 8,400,263 B2 | 3/2013 | Lickfelt et al. | |
| 9,013,408 B2* | 4/2015 | Tsai | A63F 13/24 |
| | | | 345/157 |
| 9,630,103 B2 | 4/2017 | Liu et al. | |
| 2003/0094354 A1* | 5/2003 | Badarneh | G06F 3/03548 |
| | | | 200/18 |
| 2004/0135767 A1 | 7/2004 | Park | |
| 2007/0252811 A1* | 11/2007 | Arche | A63F 13/245 |
| | | | 345/156 |
| 2010/0298053 A1 | 11/2010 | Kotkin | |
| 2015/0217191 A1* | 8/2015 | Yan | A63F 13/235 |
| | | | 463/37 |
| 2015/0238855 A1 | 8/2015 | Uy et al. | |
| 2016/0325176 A1 | 11/2016 | Liu et al. | |
| 2017/0087456 A1 | 3/2017 | Burgess et al. | |

FOREIGN PATENT DOCUMENTS

| | | |
|---|---|---|
| CN | 104368148 A | 2/2015 |
| DE | 10 2008 060 114 A1 | 6/2010 |
| DE | 10 2012 018 726 A1 | 3/2014 |
| JP | 2002-91697 A | 3/2002 |
| JP | 2002-318659 A | 10/2002 |
| TW | 201609228 A | 3/2016 |
| TW | 201639616 A | 11/2016 |
| WO | WO-2012088549 A1 * | 6/2012 ............ G05G 9/047 |
| WO | WO 2015/129984 A1 | 9/2015 |
| WO | WO 2015/179768 A1 | 11/2015 |

OTHER PUBLICATIONS

Afterglow Prismatic Wired Controller for Xbox One (https://support.pdp.com/hc/en-us/articles/218005488-Product-Overview-Manual) in 1 page.

Taiwan Office Action issued on Jul. 18, 2022 for corresponding TW Application No. 107117526.

Office Action (including English Translation) dated Mar. 1, 2022, for the corresponding Taiwanese Application No. 107117526 in 17 total pages.

Chinese Notice of First Examination Opinion; dated Jan. 31, 2023; application # 201780093491.0.

Chinese Notice of Examination Opinion; dated Oct. 31, 2023; application # 201780093491.0.

European Office Action; dated Feb. 28, 2024; Application # 17 919 200.2-042.

* cited by examiner

SLIDE BUTTON ACTUATORS

TECHNICAL FIELD

Various aspects of this disclosure generally relate to input devices, and more particularly, to a slide button actuator system.

BACKGROUND

A gaming controller is a device used with games or entertainment systems to provide input to a video game, typically to control an object or character in the game. A controller is usually connected to a game console or computer by means of a wire or cord, or wirelessly. Input devices that have been classified as gaming controllers may include keyboards, mouses, gamepads, joysticks, etc. Special purpose devices, such as steering wheels for driving games and light guns for shooting games, are also gaming controllers.

Gaming controllers have been designed and improved over the years to be as user friendly as possible. For example, gaming controllers may be designed to include directional pads, multiple buttons, analog sticks, joysticks, motion detection, touch screens and a plethora of other features to improve user experience.

Due to the limited size of a gaming controller, the number of buttons on a gaming controller may be limited. For most of the games, a certain number of buttons (e.g., 16 buttons) on a gaming controller may be enough. But this limited number of buttons may bring inconvenience to First-Person-Shooter (FPS) gamers as they have to sacrifice aiming on the right analog stick to perform other actions like reload, melee, or jump. Therefore, it may be desirable to have a button actuation mechanism on gaming controllers to provide a quick and intuitive way for the gamers to actuate a greater number of inputs with the limited number of buttons.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The limited number of buttons on a gaming controller may bring inconvenience to First-Person-Shooter gamers as they have to sacrifice aiming on the right analog stick to perform other actions like reload, melee, or jump. Therefore, it may be desirable to have a button actuation mechanism on gaming controllers to provide a quick and intuitive way for the gamers to actuate a greater number of inputs with the limited number of buttons. This disclosure of slide button actuator system may allow gamers to engage buttons by lateral directions, instead of or in conjunction with perpendicularly towards the gaming controller. As a result, one button may provide two or three inputs (e.g., slide left, slide right, press down) instead of providing one input.

In an aspect of the disclosure, an input device is provided. The input device may include a first switch and a second switch. The input device may further include a slide button on a surface of the input device. The slide button may actuate the first switch when the slide button slides along a first direction substantially parallel to the surface of the input device. The slide button may actuate the second switch when the slide button slides along a second direction substantially parallel to the surface of the input device. The input device may further include a third switch. The slide button may actuate the third switch of the input device when the slide button is pressed towards the surface of the input device.

In another aspect of the disclosure, a method of operating an input device is provided. The method may move a slide button on a surface of the input device along a first direction substantially parallel to the surface to actuate a first switch of the input device. The method may move the slide button along a second direction substantially parallel to the surface to actuate a second switch of the input device. The method may press the slide button towards the surface of the input device to actuate a third switch of the input device.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of slide button actuators will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In this disclosure, a three-position switch system is described. The three-position switch system may be a slide button that can actuate three different switches using left, right, and down motions. The slide button introduces a clear tactility point which user knows that the button is pressed or slidden and the corresponding command is given clearly.

In one embodiment, the downward motion may be facilitated by an embedded button. The embedded button may prevent user from accidentally pressing the downward switch. Garners may actuate the switches by sliding the button left or right (lateral direction), which is intuitive. As a result, one button may provide two inputs (e.g., by sliding the button left and right), instead of or in addition to one button providing one input (e.g., by pressing the button). In one embodiment, each input provided by the button may be mapped to any of the inputs provided by traditional buttons on an input device (e.g., a gaming controller).

The extra inputs provided by a slide button may allow a user to enjoy the First-Person-Shooter games more with the ability to aim while performing other functions. Also, the slide button actuation system provides a quick and intuitive way for the garners to activate the buttons. Also, instead of having one input for one button traditionally, the slide button actuation system allows two or three inputs with one button, thus providing a greater number of inputs and more control functions than traditional buttons, given the limited size of a gaming controller.

Figure 1A:
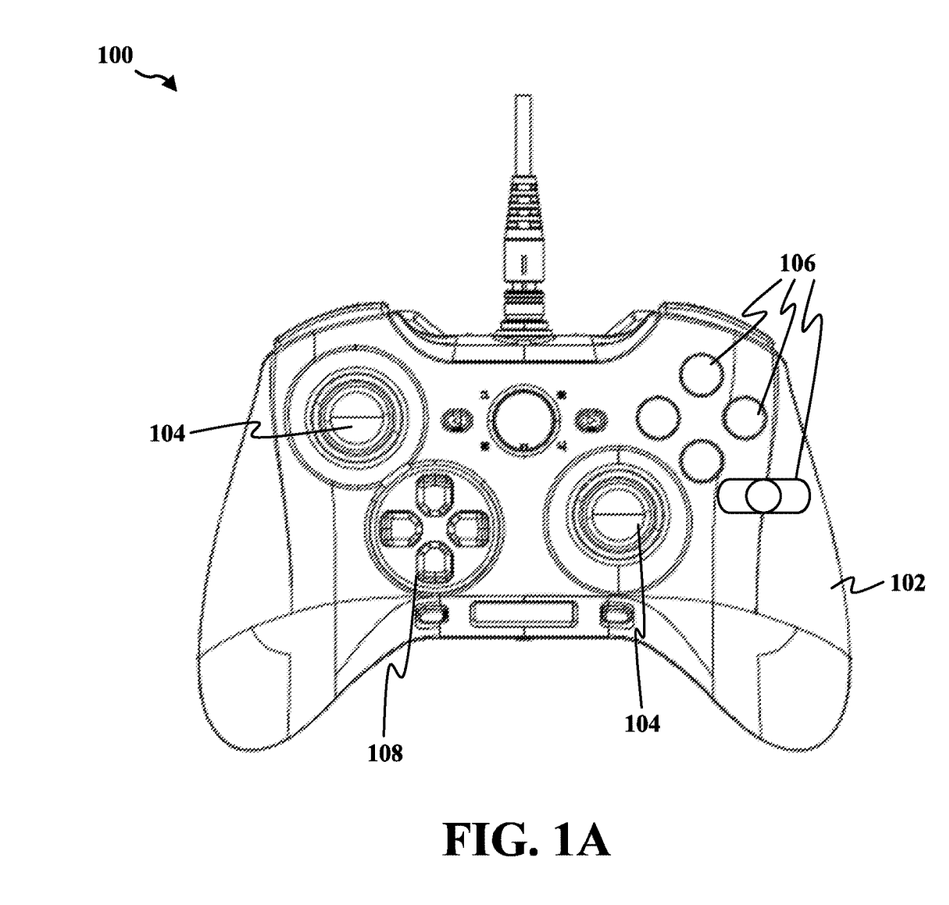
FIGS. 1A and 1B respectively illustrate a front view and a side view of an exemplary gaming controller.
Figure 1B:
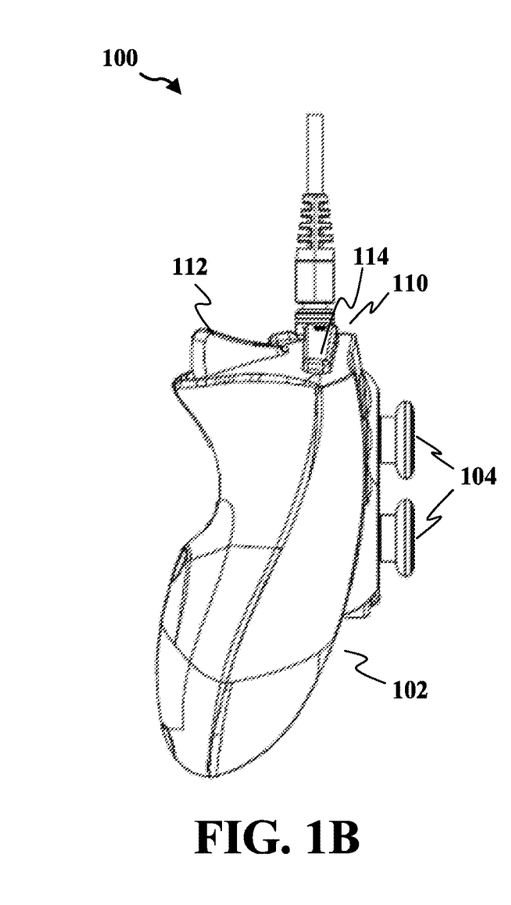

FIGS. 1A and 1B respectively illustrate a front view and a side view of an exemplary gaming controller 100. In one embodiment, the gaming controller 100 may include a top panel 102 and a front 110. The gaming controller 100 may have a set of game controls on the top panel 102 and the front 110. For example, joysticks 104, action buttons 106, and directional gamepads 108 may be placed on the top panel 102; multifunction triggers 112 and buttons 114 may be placed on the front 110. Each of the buttons 106 and 114 may be mapped to at least one gaming function.

According to various embodiments, the internal components of the gaming controller 100 may include an electronic circuit module (not shown). The electronic circuit module may include printed circuit boards, or any other suitable electronic circuit. The electronic circuit module may be coupled, by wire or wirelessly, to a gaming device. The buttons 106 and 114 may be configured to interact with the electronic circuit module of the gaming controller 100 for a user to provide inputs to the gaming device, to which the gaming controller 100 may be connected, via actuating the switches associated with buttons 106 and 114 of the gaming controller 100.

Figure 2:
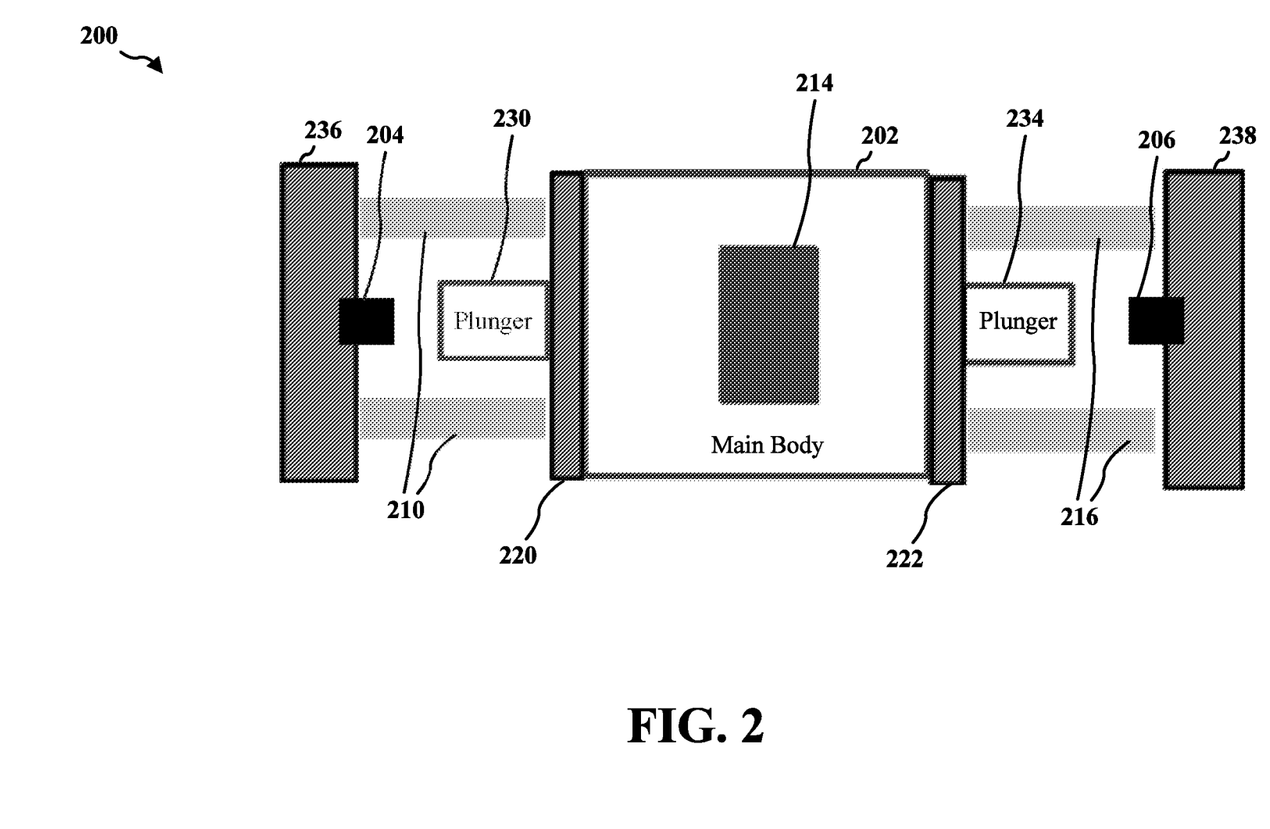
FIG. 2 is a diagram illustrating a top view of an example of a slide button actuator system.

FIG. 2 is a diagram illustrating a top view of an example of a slide button actuator system 200. In one embodiment, the slide button actuator system 200 may form a button of the buttons 106 and 114 described above with reference FIGS. 1A and 1B. In this example, the slide button actuator system 200 may include a main body 202, a plunger 230 affixed to a plunger plate 220, a plunger 234 affixed to a plunger plate 222, and switches 204, 206. The plunger 230, the plunger plate 220, and the switch 204 may be placed on one side of the main body 202; and the plunger 234, the plunger plate 222, and the switch 206 may be placed on an opposite side of the main body 202. In one embodiment, the main body 202 may be sandwiched between the plunger plates 220 and 222.

In one embodiment, the main body 202 may include an exposed button 214. The exposed button 214 may be pressed down toward the surface of a gaming controller (e.g., the gaming controller 100) to actuate a switch (not shown). In one embodiment, the switch actuated by pressing the exposed button 214 may be a micro switch, a tact switch, or a metal dome switch, or any other on/off switch. In one embodiment, the switch actuated by pressing the exposed button 214 may be a sensor that is configured to switch on/off based on sensed proximity of the exposed button 214 or sensed pressure from the exposed button 214.

In one embodiment, the switch 204 may be affixed to a component 236. In one embodiment, the component 236 may be part of the enclosure of a gaming controller (e.g., the gaming controller 100). In one embodiment, the component 236 may be affixed to the enclosure of a gaming controller. The plunger 230 and the plunger plate 220 may be kept apart from the switch 204 and the component 236 via a biasing mechanism 210. In one embodiment, the biasing mechanism 210 may include a set of springs. In one embodiment, the switch 204 may be a micro switch, a tact switch, or a metal dome switch, or any other on/off switch. In one embodiment, the switch 204 may be a sensor that is configured to switch on/off based on sensed proximity of the plunger 230 or sensed pressure from the plunger 230.

In one embodiment, the switch 206 may be affixed to a component 238. In one embodiment, the component 238 may be part of the enclosure of a gaming controller (e.g., the gaming controller 100). In one embodiment, the component 238 may be affixed to the enclosure of a gaming controller. The plunger 234 and the plunger plate 222 may be kept apart from the switch 206 and the component 238 via a biasing mechanism 216. In one embodiment, the biasing mechanism 216 may include a set of springs. In one embodiment, the switch 206 may be a micro switch, a tact switch, or a metal dome switch, or any other on/off switch. In one embodiment, the switch 206 may be a sensor that is configured to switch on/off based on sensed proximity of the plunger 234 or sensed pressure from the plunger 234. In one embodiment, each of the switches 204, 206 and the switch actuated by pressing the exposed button 214 may be mapped to a different control function of a gaming controller (e.g., the gaming controller 100), thus providing a different input to the gaming device coupled to the gaming controller.

Figure 3:
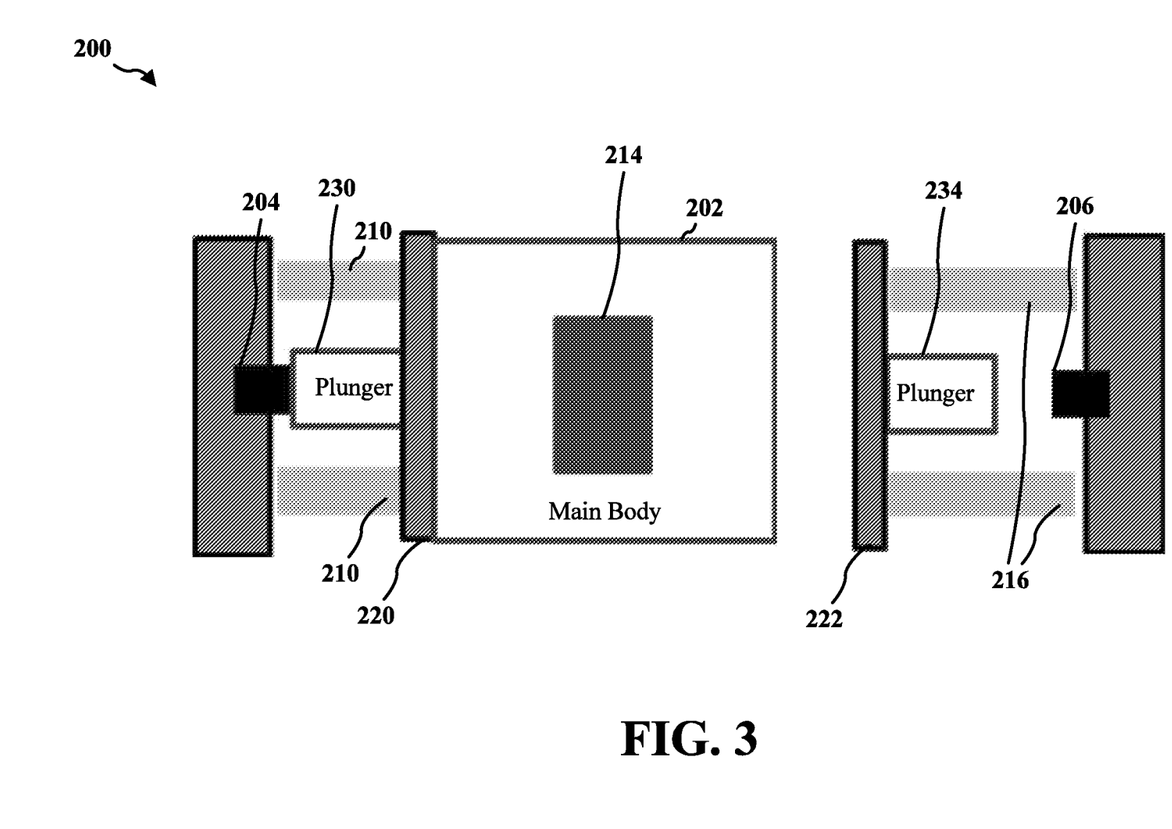
FIG. 3 is a diagram illustrating a top view of an example of the slide button actuator system described above in FIG. 2 actuating the left switch.

FIG. 3 is a diagram illustrating a top view of an example of the slide button actuator system 200 described above in FIG. 2 actuating the left switch 204. In this example, the exposed button 214 and the main body 202 slide towards the direction of the switch 204. As a result, the plunger 230 and the plunger plate 220 are pressed by a force applied by the main body 202 towards the direction of the switch 204. The biasing mechanism 210 may be compressed by the force applied by the main body 202. The plunger 230 may get closer to the switch 204 as the force applied by the main body 202 increases. In one embodiment, when the plunger 230 presses the switch 204, the switch 204 may be actuated. In one embodiment, when the plunger 230 is within a proximity threshold of the switch 204, the switch 204 may sense that the plunger 230 is within the proximity threshold and get actuated.

During the process described above with reference to FIG. 3, the plunger plate 222 and the plunger 234 may stay at their original positions as no force is applied on the plunger plate 222. The plunger plate 222 may be held at its original position by the biasing mechanism 216, which may be directly or indirectly affixed to the housing of the gaming controller.

Figure 4:
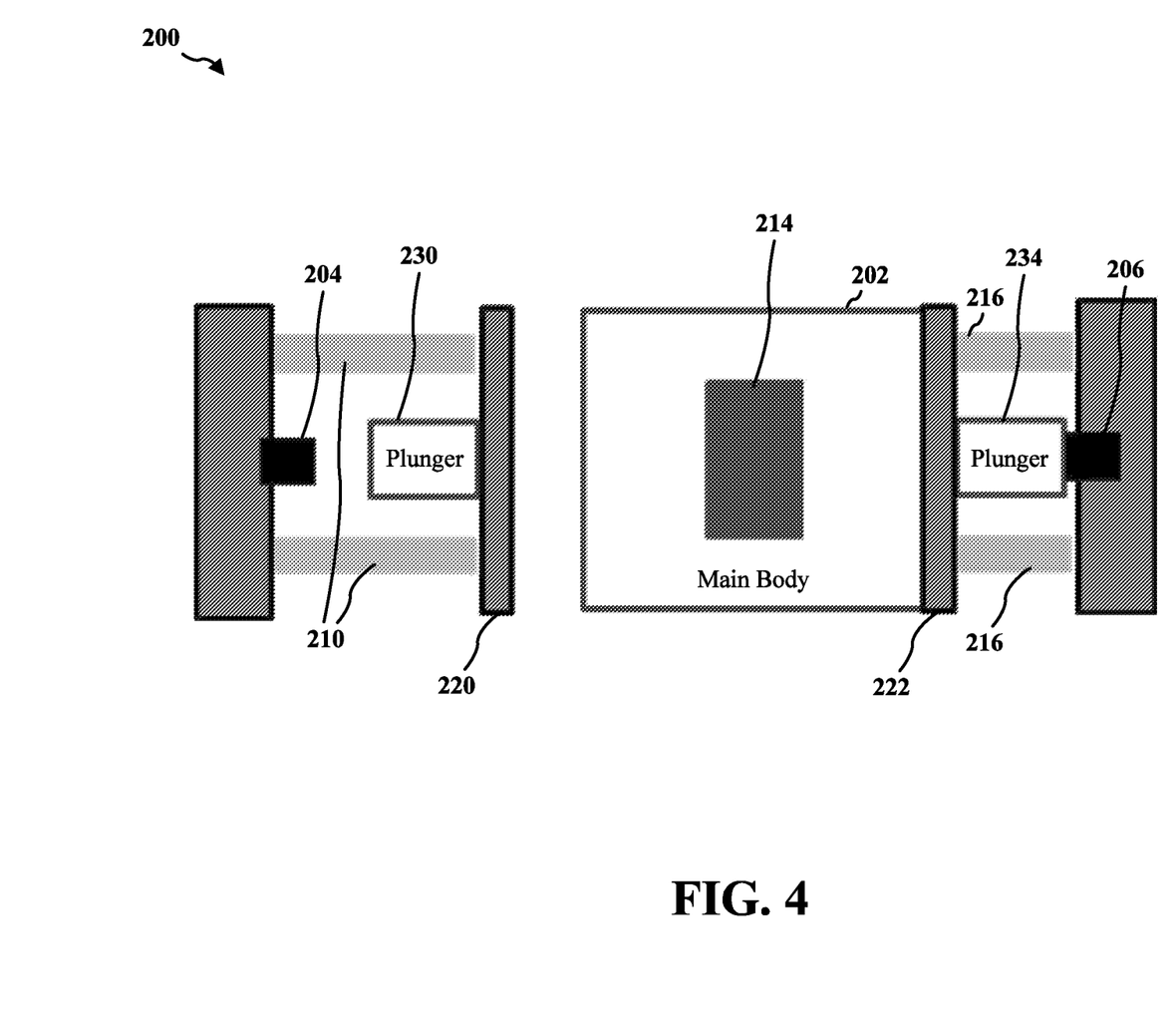
FIG. 4 is a diagram illustrating a top view of an example of the slide button actuator system described above in FIG. 2 actuating the right switch.

FIG. 4 is a diagram illustrating a top view of an example of the slide button actuator system 200 described above in FIG. 2 actuating the right switch 206. In this example, the exposed button 214 and the main body 202 slide towards the direction of the switch 206. As a result, the plunger 234 and the plunger plate 222 are pressed by a force applied by the main body 202 towards the direction of the switch 206. The biasing mechanism 216 may be compressed by the force applied by the main body 202. The plunger 234 may get closer to the switch 206 as the force applied by the main body 202 increases. In one embodiment, when the plunger 234 presses the switch 206, the switch 206 may be actuated. In one embodiment, when the plunger 234 is within a proximity threshold of the switch 206, the switch 206 may sense that the plunger 234 is within the proximity threshold and get actuated.

During the process described above with reference to FIG. 4, the plunger plate 220 and the plunger 230 may stay at their original positions as no force is applied on the plunger plate 220. The plunger plate 220 may be held at its original position by the biasing mechanism 210, which may be directly or indirectly affixed to the housing of the gaming controller.

In one aspect, an input device (e.g., the gaming controller 100 or the slide button actuator system 200) is provided. The input device may include a first switch (e.g., the switch 204) and a second switch (e.g., the switch 206). The input device may include a slide button (e.g., the exposed button 214 or the main body 202) on a surface of the input device. The slide button may actuate the first switch when the slide button slides along a first direction (e.g., towards the switch 204) substantially parallel to the surface of the input device. The slide button may actuate the second switch when the slide button slides along a second direction (e.g., towards the switch 206) substantially parallel to the surface of the input device.

In one embodiment, the slide button may be placed between the first switch and the second switch. The first direction may be the opposite direction of the second direction. In one embodiment, the input device may be a gaming controller. In one embodiment, the input device may further include a third switch. The slide button may actuate the third switch of the input device when the slide button is pressed towards the surface of the input device. In one embodiment, each of the first switch and the second switch may be one of a micro switch, a tact switch, or a metal dome switch.

In one embodiment, the first switch (e.g., the switch 204) may be kept apart from a first plunger (e.g., the plunger 230) via a first biasing mechanism (e.g., the biasing mechanism 210). The second switch (e.g., the switch 206) may be kept apart from a second plunger (e.g., the plunger 234) via a second biasing mechanism (e.g., the biasing mechanism 216). In one embodiment, the first biasing mechanism may include a first set of springs and the second biasing mechanism may include a second set of springs.

In one embodiment, the slide button may press the first plunger when the slide button slides along the first direction; and the first biasing mechanism may be compressed when the first plunger is pressed. In one embodiment, the first switch may be actuated when the first plunger contacts the first switch.

In one embodiment, the slide button may press the second plunger when the slide button slides along the second direction; and the second biasing mechanism may be compressed when the second plunger is pressed. In one embodiment, the second switch may be actuated when the second plunger contacts the second switch.

Figure 5:
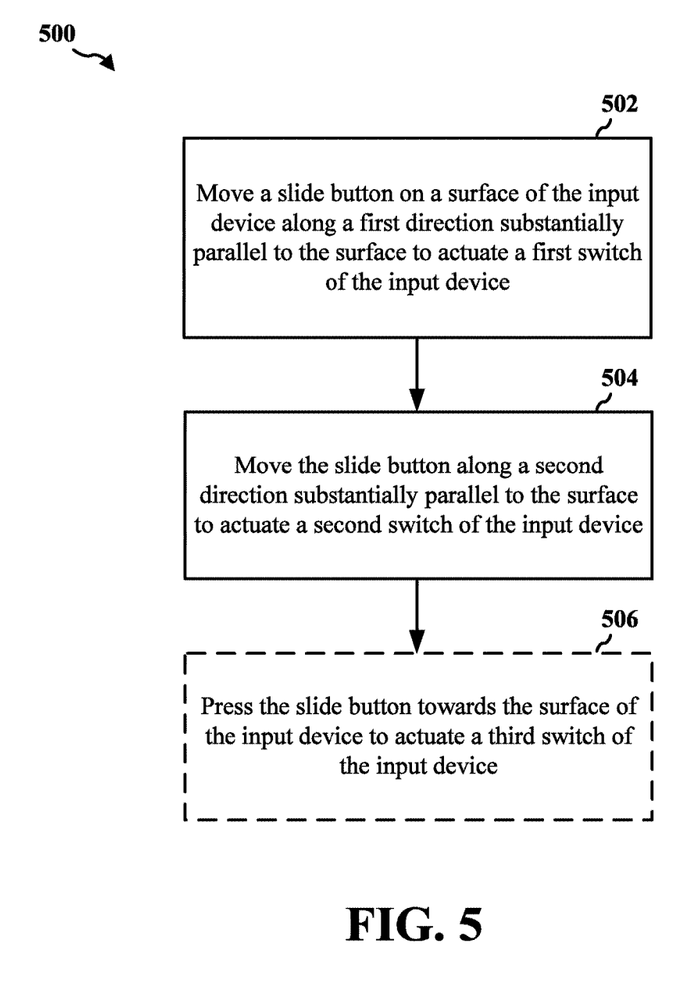
FIG. 5 is a flowchart of a method of operating an input device.

FIG. 5 is a flowchart 500 of a method of operating an input device. The input device may be coupled to a gaming device. In one embodiment, the input device may be the gaming controller 100 described above with reference to FIG. 1 or the slide button actuator system 200 described above with reference to FIGS. 2-4.

At 502, the method may move a slide button (e.g., the exposed button 214 or the main body 202) on a surface of the input device along a first direction substantially parallel to the surface to actuate a first switch (e.g., the switch 204) of the input device. In one embodiment, the first direction may be left to a user of the input device.

At 504, the method may move the slide button along a second direction substantially parallel to the surface to actuate a second switch (e.g., the switch 206) of the input device. In one embodiment, the second direction may be right to a user of the input device. In one embodiment, the slide button may be placed between the first switch and the second switch. The first direction may be an opposite direction of the second direction. In one embodiment, each of the first switch and the second switch may be one of a micro switch, a tact switch, or a metal dome switch.

In one embodiment, the first switch may be kept apart from a first plunger via a first biasing mechanism; and the second switch may be kept apart from a second plunger via a second biasing mechanism. In one embodiment, the first biasing mechanism may include a first set of springs and the second biasing mechanism may include a second set of springs.

In one embodiment, the slide button may press the first plunger when the slide button moves along the first direction. The first biasing mechanism may be compressed when the first plunger is pressed. In one embodiment, the first switch may be actuated when the first plunger contacts the first switch.

In one embodiment, the slide button may press the second plunger when the slide button moves along the second direction. The second biasing mechanism may be compressed when the second plunger is pressed. In one embodiment, the second switch may be actuated when the second plunger contacts the second switch.

At 506, the method may optionally press the slide button towards the surface of the Input device to actuate a third switch of the input device. In one embodiment, the third switch may be actuated when the slide button presses the third switch.

In the following, various aspects of this disclosure will be illustrated:

Example 1 is an input device. The input device may include a first switch, a second switch, and a slide button on a surface of the input device. The slide button may actuate the first switch when the slide button slides along a first direction substantially parallel to the surface of the input device. The slide button may actuate the second switch when the slide button slides along a second direction substantially parallel to the surface of the input device.

In Example 2, the subject matter of Example 1 may optionally include that the slide button may be placed between the first switch and the second switch. The first direction may be an opposite direction of the second direction.

In Example 3, the subject matter of any one of Examples 1 to 2 may optionally include that the input device is a gaming controller.

In Example 4, the subject matter of any one of Examples 1 to 3 may optionally include that the input device may further include a third switch. The slide button may actuate the third switch of the input device when the slide button is pressed towards the surface of the input device.

In Example 5, the subject matter of any one of Examples 1 to 4 may optionally include that each of the first switch and the second switch is one of a micro switch, a tact switch, or a metal dome switch.

In Example 6, the subject matter of any one of Examples 1 to 5 may optionally include that the first switch may be kept apart from a first plunger via a first biasing mechanism, and the second switch may be kept apart from a second plunger via a second biasing mechanism.

In Example 7, the subject matter of Example 6 may optionally include that the first biasing mechanism may include a first set of springs and the second biasing mechanism may include a second set of springs.

In Example 8, the subject matter of any one of Examples 6 to 7 may optionally include that the slide button may press the first plunger when the slide button slides along the first direction, and the first biasing mechanism may be compressed when the first plunger is pressed.

In Example 9, the subject matter of any one of Examples 6 to 8 may optionally include that the first switch may be actuated when the first plunger contacts the first switch.

In Example 10, the subject matter of any one of Examples 6 to 9 may optionally include that the slide button may press the second plunger when the slide button slides along the second direction, and the second biasing mechanism may be compressed when the second plunger is pressed.

In Example 11, the subject matter of any one of Examples 6 to 10 may optionally include that the second switch may be actuated when the second plunger contacts the second switch.

Example 12 is a method of operating an input device. The method may move a slide button on a surface of the input device along a first direction substantially parallel to the surface to actuate a first switch of the input device, and move the slide button along a second direction substantially parallel to the surface to actuate a second switch of the input device.

In Example 13, the subject matter of Example 12 may optionally include that the slide button may be placed between the first switch and the second switch. The first direction may be an opposite direction of the second direction.

In Example 14, the subject matter of any one of Examples 12 to 13 may optionally include that the input device may be a gaming controller.

In Example 15, the subject matter of any one of Examples 12 to 14 may optionally include that the method may further press the slide button towards the surface of the input device to actuate a third switch of the input device.

In Example 16, the subject matter of any one of Examples 12 to 15 may optionally include that each of the first switch and the second switch is one of a micro switch, a tact switch, or a metal dome switch.

In Example 17, the subject matter of any one of Examples 12 to 16 may optionally include that the first switch may be kept apart from a first plunger via a first biasing mechanism, and the second switch may be kept apart from a second plunger via a second biasing mechanism.

In Example 18, the subject matter of Example 17 may optionally include that the first biasing mechanism may include a first set of springs and the second biasing mechanism may include a second set of springs.

In Example 19, the subject matter of any one of Examples 17 to 18 may optionally include that the slide button may press the first plunger when the slide button moves along the first direction, and the first biasing mechanism may be compressed when the first plunger is pressed.

In Example 20, the subject matter of any one of Examples 17 to 19 may optionally include that the first switch may be actuated when the first plunger contacts the first switch.

In Example 21, the subject matter of any one of Examples 17 to 20 may optionally include that the slide button may press the second plunger when the slide button moves along the second direction, and the second biasing mechanism may be compressed when the second plunger is pressed.

In Example 22, the subject matter of any one of Examples 17 to 21 may optionally include that the second switch may be actuated when the second plunger contacts the second switch.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A gaming controller, comprising of:
a top panel; and
a set of game controls;
wherein the set of game controls is disposed at the top panel,
wherein the set of game controls comprises:
  at least one directional gamepad; and at least one three-position switch system,
wherein the at least one three-position switch system comprises:
  a first switch;
  a first plunger, wherein the first switch is kept apart from the first plunger;
  a second switch;
  a second plunger, wherein the second switch is kept apart from the second plunger;
  a third switch; and
  a slide button at a surface of the top panel, the slide button being separately placed between the first plunger and the second plunger,
wherein when the slide button slides away from the second plunger and along a first linear direction parallel to the surface of the top panel towards the first switch, the slide button presses the first plunger to move along the first linear direction so as to actuate the first switch,
wherein when the slide button slides away from the first plunger and along a second linear direction parallel to the surface of the top panel towards the second switch, the slide button presses the second plunger to move along the second linear direction so as to actuate the second switch,
wherein the slide button actuates the third switch of the three-position switch system when the slide button is pressed towards the surface of the top panel.

2. The gaming controller of claim 1, wherein the first linear direction is parallel to the second linear direction but in an opposite direction of the second linear direction.

3. The gaming controller of claim 1, wherein the set of game controls further comprises at least one joy stick.

4. The gaming controller of claim 1, wherein the first switch is kept apart from the first plunger via a first set of springs disposed along the first linear direction, wherein the second switch is kept apart from a-the second plunger via a second set of springs disposed along the second linear direction.

5. The gaming controller of claim 4, wherein the first set of springs is compressed and the second set of springs remains when the first plunger is pressed by the slide button.

6. The gaming controller of claim 4, wherein the second set of springs is compressed and the first set of springs remains when the second plunger is pressed by the slide button, and/or wherein the second switch is actuated when the second plunger contacts the second switch.

7. The gaming controller of claim 1, wherein the first switch is actuated when the first plunger contacts the first switch.

8. The gaming controller of claim 1, wherein the first switch is actuated on sensed proximity of the slide button or sensed pressure from the slide button, and/or the second switch is actuated on sensed proximity of the slide button or sensed pressure from the slide button.

9. The gaming controller of claim 1, further comprising:
a first plunger plate, the first plunger affixed to the first plunger plate; and a second plunger plate, the second plunger affixed to the second plunger plate,
wherein the slide button is placed between the first plunger plate and the second plunger plate.

10. The gaming controller of claim 1, wherein the at least one directional gamepad is disposed at a first half portion of the top panel and the at least one three-position switch system is disposed at a second half portion of the top panel.

11. The gaming controller of claim 1, wherein the first switch is proximal to the directional gamepad and the second switch is distal to the directional gamepad.

12. A method of operating a gaming controller, wherein the gaming controller
a top panel; and
a set of game controls;
wherein the set of game controls is disposed at the top panel,
wherein the set of game controls comprises:
at least one directional gamepad; and at least one three-position switch system,
wherein the at least one three-position switch system comprises:
a first switch kept apart from a first plungers
a second switch kept apart from a second plunger and a third switch, the method comprising:
sliding a slide button on a surface of the top panel away from the second plunger and along a first linear direction parallel to the surface towards the first switch to actuate the first switch of the at least one three-position switch system, wherein the first plunger is pressed by the slide button to move along the first linear direction so as to actuate the first switch;

sliding the slide button away from the first plunger and along a second linear direction parallel to the surface towards the second switch to actuate a-the second switch of the at least one three-position switch system, wherein the second plunger is pressed by the slide button to move along the second linear direction so as to actuate the second switch; and pressing the slide button towards the surface of the top panel to actuate the third switch of the gaming controller.

13. The method of claim 12, wherein the first linear direction is parallel to the second linear direction but in an opposite direction of the second linear direction.

14. The method of claim 12, wherein the set of game controls further comprises of at least one joy stick.

15. The method of claim 12, wherein the first switch is kept apart from the first plunger via a first set of springs disposed along the first linear direction, wherein the second switch is kept apart from a-the second plunger via a second set of springs disposed along the second linear direction.

16. The method of claim 15, wherein the first set of springs is compressed and the second set of springs remains when the first plunger is pressed.

17. The method of claim 15, wherein the second set of springs is compressed and the first set of springs remains when the second plunger is pressed, and/or wherein the second switch is actuated when the second plunger contacts the second switch.

18. The method of claim 12, wherein the first switch is actuated when the first plunger contacts the first switch.

19. The method of claim 12, wherein the first switch is actuated on sensed proximity of the slide button or sensed pressure from the slide button, and/or the second switch is actuated on sensed proximity of the slide button or sensed pressure from the slide button.

* * * * *